(12) United States Patent
Zhang

(10) Patent No.: US 8,715,509 B2
(45) Date of Patent: May 6, 2014

(54) TANNING WASTEWATER TREATMENT AND REUSE APPARATUS AND METHOD THEREFOR

(75) Inventor: Shiwen Zhang, Fujian (CN)

(73) Assignee: Boying Xiamen Science and Technology Co., Ltd., Xiamen (CN)

( * ) Notice: Subject to any disclaimer, the term of this patent is extended or adjusted under 35 U.S.C. 154(b) by 0 days.

(21) Appl. No.: 13/992,755

(22) PCT Filed: Jul. 1, 2011

(86) PCT No.: PCT/CN2011/076759
§ 371 (c)(1),
(2), (4) Date: Jun. 9, 2013

(87) PCT Pub. No.: WO2012/083674
PCT Pub. Date: Jun. 28, 2012

(65) Prior Publication Data
US 2013/0256224 A1  Oct. 3, 2013

(30) Foreign Application Priority Data

Dec. 24, 2010  (CN) .......................... 2010 1 0605706

(51) Int. Cl.
*C02F 1/00*  (2006.01)

(52) U.S. Cl.
USPC .................. 210/748.01; 210/763; 210/195.1; 210/295

(58) Field of Classification Search
USPC .......................... 210/748.01, 763, 195.1, 295
See application file for complete search history.

(56) References Cited

U.S. PATENT DOCUMENTS 5,328,677 A * 7/1994 Waite et al. .................. 423/560

* cited by examiner

*Primary Examiner* — Chester Barry

(57) ABSTRACT

A tanning wastewater treatment and reuse apparatus includes a coarse filter, a regulation pool, a hydraulic sieve, a desulfurization pool, a first nanocatalytic electrolyzer, a flocculation pool, a first settling pool, a flotation device, a biochemical pool, a second settling pool, a second nanocatalytic electrolyzer, a fine filter, and a compressor. Also provided is a tanning wastewater treatment and reuse method includes the steps of desulfurization, first nanocatalytic electrolysis, flocculation, biochemical treatment, second catalytic electrolysis, and filtration. The invention allows high $COD_{Cr}$ removal rate, reduced chemical agent consumption, reduced sludge formation, thorough treatment, and high water reuse rate.

9 Claims, 3 Drawing Sheets

Table 1

| No. | Item | Unit | Measured values | No. | Item | Unit | Measured values |
|---|---|---|---|---|---|---|---|
| 1 | $COD_{Cr}$ | mg/L | 3560 | 6 | $S^{2-}$ | mg/L | 82 |
| 2 | SS | mg/L | 3110 | 7 | Chromaticity | | 3200 |
| 3 | $NH_3$-N | mg/L | 265 | 8 | pH | | 9.3 |
| 4 | Cr | mg/L | 120 | 9 | Conductivity | µS/cm | 3200 |
| 5 | BOD5 | mg/L | 1730 | 10 | Sodium chloride | ‰ | 23 |

FIG. 2

Table 2

| No. | Item | Unit | Measured values | No. | Item | Unit | Measured values |
|---|---|---|---|---|---|---|---|
| 1 | $COD_{Cr}$ | mg/L | 37 | 4 | Chromaticity | | 1 |
| 2 | SS | mg/L | 0 | 5 | pH | | 7.7 |
| 3 | Turbidity | NTU | 2 | 6 | Conductivity | µS/cm | 2100 |

FIG. 3

Table 3

| No. | Item | Unit | Measured values | No. | Item | Unit | Measured values |
|---|---|---|---|---|---|---|---|
| 1 | $COD_{Cr}$ | mg/L | 3900 | 6 | $S^{2-}$ | mg/L | 92 |
| 2 | SS | mg/L | 4070 | 7 | Chromaticity | | 2900 |
| 3 | $NH_3$-N | mg/L | 283 | 8 | pH | | 9.3 |
| 4 | Cr | mg/L | 93 | 9 | Conductivity | µS/cm | 3766 |
| 5 | BOD5 | mg/L | 1950 | 10 | Sodium chloride | ‰ | 25 |

FIG. 4

Table 4

| No. | Item | Unit | Measured values | No. | Item | Unit | Measured values |
|---|---|---|---|---|---|---|---|
| 1 | $COD_{Cr}$ | mg/L | 33 | 4 | Chromaticity | | Colorless |
| 2 | SS | mg/L | 0 | 5 | pH | | 7.5 |
| 3 | Turbidity | NTU | 2 | 6 | Conductivity | µS/cm | 2465 |

FIG. 5

TANNING WASTEWATER TREATMENT AND REUSE APPARATUS AND METHOD THEREFOR

BACKGROUND OF THE INVENTION

1. Field of the Invention

The invention relates to tanning wastewater treatment, and more particularly to a tanning wastewater treatment and reuse apparatus and method therefore based on nanotechnology and biotechnology.

2. Description of Related Art

According to statistics, China's leather industry wastewater discharged into the environment per year up to more than 100 million tons, accounting for China's industrial wastewater emissions by 0.3%. In light industry, it is ranked No. 3 behind the paper and brewing industries in terms of wastewater discharge. The tanning industry not only consumes a large volume of freshwater but also discharges a lot of wastewater to the environment and it has adverse effects to health and the sustainable development of society as well as poses a serious threat. Thus, it is desired to improve tanning wastewater treatment. Advances in tanning wastewater treatment and water reuse and freshwater resources conservation, either from the point of view resources conservation or from the point of view of environmental protection, are very necessary and are very important.

Leather industry wastewater discharges high concentrations of organic pollutants in the presence of suspended matters, large volume of wastewater, and complicated wastewater components. It contains toxic substances such as sulfur and chromium. In accordance with the production process, the leather industry wastewater consists of seven parts: original leather containing high concentrations of chloride and acid wash water soaking, lime and sodium sulfide containing highly alkaline liming, wastewater containing trivalent chromium blue chrome, tanning wastewater containing tannin and gallic acid, dark brown vegetable tanned wastewater containing fats and oils, skim wastewater, wastewater and degreased stain rinse wastewater in each manufacturing step. Among them, degreasing wastewater, wastewater with removed liming, chrome tanning wastewater pollutions are most serious.

Degreasing waste: the production of pig leather production accounted for 80% of the production of pig fat in water. The fat content is up to 10,000 (mg/L) and $COD_{Cr}$ is 20,000 (mg/L). Wastewater effluent accounts for 4% of total fat but the fat effluent oxygen load accounted for 30% to 40% of the total load.

Dehydration liming wastewater: removal of sulfide liming wastewater pollution. Wastewater has $COD_{Cr}$ of 2,0000 to 4,0000 (mg/L), $BOD_5$ of 4,000 (mg/L), sodium of 1,200 to 1,500 (mg/L), and pH of 12. The total water removal liming is 10% of wastewater and oxygen consumes 40% of the total load.

Chrome tanning wastewater: chrome tanning wastewater polluted trivalent chromium. In chrome tanning process, chromium adhesion rate is 60% to 70%, i.e., 30% to 40% of chromium salts in water. Wastewater in chrome has $Cr^{3+}$ 3,000 to 4,000 (mg/L), $COD_{Cr}$ 1,0000 (mg/L), and $BOD_5$ 2,000 mg/L.

The conventional tanning wastewater treatment technology is a process of collecting and mixing wastewater prior to discharging into the sewage treatment system. But because wastewater contains large amounts of sulfide and chromium ions, it is easy to inhibit microbial. It is more reasonable that the liquid is treated alone, a unified comprehensive wastewater treatment of the process line is implemented, the wastewater is defatted, liming is removed from wastewater, chrome tanning wastewater is processed separately with recovery of valuable resources, and then is mixed with other unified treatments of wastewater.

After concentrating the brightest tanning wastewater, called tanning combined wastewater which has tanning wastewater organic content and sulfur compounds, chromium compounds content, and oxygen consumption, and its pollution is very serious. It is mainly in the following areas:

Chromaticity: Leather Wastewater by larger, mainly by vegetable tanning, dyeing, tanning and chrome gray alkaline waste caused.

Alkalinity: In general, leather wastewater is alkaline. Combine wastewater has a pH value between 8 and 12. The alkalinity is mainly from lime, caustic soda and sodium sulfide used in processes.

Sulfide: Sulfides in tanning wastewater mainly come from soda ash waste removal a small part comes from the flooding of sulfide waste and the soft protein decomposition products. It is easy to produce sulfur-containing waste acids $H_2S$ gas. Sulfur sludge under anaerobic conditions will release $H_2S$ gas.

Chromium ions: Tanning wastewater is mainly in the form of chromium ions $Cr^{3+}$. Its content is generally of 100 to 3,000 mg/L. Usually, it first goes through neutralization and sedimentation, then filtration, and finally feeds to combined wastewater pool.

Organic Pollutant: Tanning wastewater has a high content of protein and other organic matter, and a certain amount of reduction substances, so that $BOD_5$ and $COD_{Cr}$ are high.

In tanning process, a great volume of wastewater is discharged each step. In each step, after discharging wastewater combined wastewater is collected and the combined wastewater has a pH of between 8 to 12, chromaticity, $COD_{Cr}$, SS, $BOD_5$ concentrations are very high. It is toxic and contains harmful substances. It also has high concentrations of salts. Tanning industry's overall wastewater quality (test average) is that pH is between 8 and 12, chromaticity (times) is between 500 and 3,500, $COD_{Cr}$ is between 3,000 and 4,000, SS is between 2,000 and 4,000, $NH_{3\_}N$ is between 250 and 300, $S^{2-}$ is between 50 and 100, Cr is between 100 and 3,000, and $BOD_5$ is between 1,500 and 2,000. It is noted that units, except pH and chromaticity, are mg/L.

Currently, tanning wastewater treatment methods include coagulation, adsorption, advanced oxidation technology, direct loop back usage, flotation, acid absorption, catalytic oxidation, and biochemical method. Each method has a number of advantages and disadvantages. Since a single process is very difficult to achieve the desired effect, in practice, it is typical that wastewater treatment depends on the actual situation and a combination of several methods. Wong Chun introduced a Guangdong-based tanning plant using activated sludge flocculation+contact oxidation process for tanning wastewater treatment. Since being produced in December 2003, it brought about a stable treatment effect. The influent $COD_{Cr}$ is 3,000 to 3,500 mg/L. The effluent $COD_{Cr}$ is about 40 mg/L. The effluent targets were found to meet provincial standard (DB44/26-2001). Zhang Jie et al. applied sequencing batch activated sludge process (SBR) in a Henan-based tanning for wastewater treatment. First, using the chemical method to remove large amounts of toxic substances in the wastewater and some organic matter, and then through the SBR to process biodegradable dissolved organic matter. Designed as daily processing capacity of 800 $m^3$, when the influent $COD_{Cr}$ is 2,500 mg/L, the effluent $COD_{Cr}$ is 100 mg/L, far below the national standard ($COD_{Cr}$<300 mg/L). The running cost of the item is 0.8 yuan/ton. The results show that, with the SBR processing tanning wastewater, it is adapted to improve water quality and increase resistance to shock loading capability, especially for the relative concentration of tanning wastewater discharging and water changing characteristics. Moreover, SBR treatment is supported by the provincial investment, and thus operating cost is lower than normal activated sludge process. Gu Qiuping et al. use contact oxidation processes in a Shenyang-based tanning wastewater treatment facilities to transform not only the treated wastewater in order to meet emission requirements, but also improve the processing power and effect. The recovery of $Cr^{3+}$ is 80% so that a portion of the treated wastewater can be reused. When influent COD is 3,647 mg/L, after the treatment, the effluent $COD_{Cr}$ concentration is 77 mg/L below the Liaoning Province "DB21-60-89" extension and revised standards ($COD_{Cr}$<100 mg/L). Yang Jianjun, Gao Zhong Bo, and Jie Shao of the trial artillery battalion Xinji leather factory use materialized+oxidation ditch process to modify the original jet aeration sewage treatment system. Its capacity, after the transformation of the treated water, is increased to 4,800 m³/day. Influent $COD_{Cr}$ is 6,100 mg/L and it is an effective wastewater treatment. Actual operations show that the transformation process of the treatment efficiency is high, water quality meets the national "Integrated Wastewater Discharge Standard". Taoru Jun introduces it to Zhejiang Industrial Zone by using a tanning coagulation+hydrolytic acidification+CAST technology, right from the preparation to tanning and other wet processing section of the integrated wastewater treatment. Designed for maximum water flow of 6,000 m³/day, sulfur ions in wastewater is by pre-aeration, and in the reaction cell plus $FeSO_4$ and coagulant PAC, thereby precipitating removal of $Cr^{3+}$ by reaction with NaOH in order to precipitate the removal of the reaction. Biochemical and oxygen, and aerobic treatment using a combination of techniques, and oxygen using contact acidification process, which can improve the biodegradability of wastewater while removing a portion of $COD_{Cr}$ and SS. Aerobic processes using CAST modified SBR process, with increased organic removal efficiency, impact load capacity and other characteristics. Sunya Bing et al. in China Patent CN100371268C disclose a tanning wastewater treatment by electrolysis method. The treated wastewater $COD_{Cr}$ removal rate is 60% to 80%, ammonia nitrogen removal rate is 50% to 70%, sulfur removal rate is at least 95%, suspended solids removal rate is 70% to 80%, and chromaticity removal rate is at least 85%. Coli killing rate is more than 99%. However, this method has a high anode consumption and a high energy consumption.

In summary, the conventional methods has drawbacks including multi-material consumption, high emissions from sludge, wastewater treatment having not reached the industrial wastewater reuse standards for wastewater discharge, high cost and complex operation, easy to produce secondary pollution, and creating a number of difficult issues to be solved. Thus, there is a need of low material consumption, sludge discharging a small volume of wastewater after treatment to be performed in the water reuse. Also, there is a need of low cost, new wastewater treatment methods with easy operation in order to facilitate the production of lower leather material consumption per unit of product, save fresh water resources, and protect the environment.

SUMMARY OF THE INVENTION

Disclosure of the invention

Technical Issues

The object of the invention is to solve problems of conventional tanning wastewater treatment such as consuming more chemicals, sludge discharging a large quantity of wastewater after treatment in order to reach the standard of industrial wastewater reuse, wastewater discharging more water wastage, high cost, complicated to operate, and easy to produce secondary pollution and other shortcomings, thereby increasing $COD_{Cr}$ removal efficiency, lowering consumption of chemicals, producing less sludge, having a more thorough treatment, an increased water reuse rate based on the catalytic electrolysis and biochemical techniques tanning wastewater treatment apparatus and method for recycling.

Technology Solutions

Tanning wastewater of the invention is directed to collect mixed wastewater discharged from each step called tanning combined wastewater.

A tanning wastewater treatment and reuse apparatus according to the invention comprises a coarse filter, a regulation pool, a hydraulic sieve, a desulfurization pool, a first nanocatalytic electrolyzer, a flocculation pool, a first settling pool, a flotation device, a biochemical pool, a second settling pool, a second nanocatalytic electrolyzer, a fine filter, and a compressor wherein the coarse filter has an inlet communicating with an external wastewater source, outlet of the coarse filter connects to entrance of the regulation pool, inlet of the hydraulic sieve communicates with the wastewater source, inlet of the desulfurization pool is connected to outlet of the hydraulic sieve, outlet of the desulfurization pool is connected to a pump via pipes, an inlet of the first nanocatalytic electrolyzer is connected to a wastewater outlet of the desulfurization pool, an outlet of the first nanocatalytic electrolyzer is connected to an inlet of the desulfurization pool, an outlet of the desulfurization pool is connected to an inlet of the first settling pool, a precipitate outlet of the first settling pool is connected to the pump via pipes, a wastewater outlet of the first settling pool is connected to an inlet of the flotation device, an impurities outlet of the flotation device is connect to the pump via pipes, a wastewater outlet of the flotation device is connected to the biochemical pool via the pump, an outlet of the biochemical pool is connected to an inlet of the second settling pool, a wastewater outlet of the second settling pool is connected to an inlet of the second nanocatalytic electrolyzer, a precipitate outlet of the second settling pool is connected to the pump via pipes, a wastewater outlet of the second nanocatalytic electrolyzer is connected to an inlet of the fine filter, an outlet of the compressor is connected to the biochemical pool, and impurities of the compressor are conveyed to a mud pool via a conveyor.

An impurities outlet of the flotation device is disposed on an upper portion. A wastewater outlet of the flotation device is located on a lower portion. The wastewater outlet of the second settling pool is located on an upper portion. The precipitate outlet of the second settling pool is located on bottom.

Anode of the first nanocatalytic electrolyzer is a titanium substrate having a surface covered with crystal grains of 15 to 32 nm nanocatalytic coating and served as an inert electrode.

Cathode of the first nanocatalytic electrolyzer is a cathode made of iron, aluminum, stainless steel, zinc, copper or graphite.

A tanning wastewater treatment and reuse method of the invention comprises the following steps:

Step 1 of Desulfurization

Flowing tanning combined wastewater into the coarse filter to remove large particles of solids flowing into the regulation pool, and then activate a pump in the regulation pool to force wastewater to pass a sieve to remove fibers and other impurities prior to flowing into the desulfurization pool, adding ferrous sulfate solution, performing desulfurization, and separating into iron sulfide sludge and desulfurized wastewater.

In step 1, equivalent concentration of sulfur in wastewater can be determined prior to the desulfurization, and then adding a solution of ferrous sulfate with equivalent concentration of 1:1.1 into wastewater for desulfurization and separation into iron sulfide sludge and desulfurized wastewater.

Step 2 of First Nanocatalytic Electrolysis

After step 1, pump desulfurized wastewater into the first nanocatalytic electrolyzer for electrolysis.

In step 2, the operating voltage of the electrolysis may be 2 to 500V, the voltage between the two electrodes may be 2 to 8 V, electrolytic density is 10 to 300 mA/cm$^2$, and the desulfurized wastewater is kept in the first nanocatalytic electrolyzer for a time of 5 to 15 min.

Step 3 of Flocculation

After step 2, flowing wastewater which has been processed by the first nanocatalytic electrolyzer into the flocculation pool, adding prepared flocculants, coagulant agents and flotation agents to the flocculation pool for flocculation reaction, flowing same to the first settling pool for precipitate, flowing the precipitate on the bottom of the first settling pool to the compressor via pump and pipes for separating into filtrate and sludge, flowing wastewater in the first settling pool to the flotation device for separating the impurities from the wastewater, flowing the impurities to a compressor via pump and pipes for separating into filtrate and sludge, flowing the filtrate to the first nanocatalytic electrolyzer, and flowing the wastewater in a lower portion of the flotation device into the biochemical pool.

In step 3, the flocculants can be ferrous sulfate, ferric sulfate, poly iron, aluminum sulfate, aluminum chloride, or poly aluminum, the coagulant can be lime, polyacrylamide (PAM), etc., and the flotation agents may be PAM, etc.

Step 4 of Biochemical Treatment

After step 3, flocculated wastewater in a lower portion of the flotation device flowing into the biochemical pool, next subjecting same through aerobic or anaerobic+aerobic or anoxic, and aerobic treatment, and subjecting same in the second settling pool, flowing the biochemically processed wastewater out of upper portion of the second settling pool, precipitate accumulated on bottom of the second settling pool pumped by the pump to the compressor via pipes for separating into filtrate and sludge, flowing the filtrate flows to the biochemical pool via pipes, and subjecting the filtrate to a biochemical treatment to obtain biochemically treated wastewater.

Step 5 of Second Catalytic Electrolysis

Flowing biochemically treated wastewater out of upper portion of the second settling pool into the second nanocatalytic electrolyzer for electrolysis.

In step 5, the operating voltage of the electrolysis may be 2 to 400V, the voltage between the two electrodes may be 2 to 8 V, the current density is 10 to 300 mA/cm$^2$, and wastewater is kept in the second nanocatalytic electrolyzer for 2 to 6 min.

Step 6 of Filtration

Flowing wastewater from the second nanocatalytic electrolyzer into a fine filter to remove solid impurities.

In step 6, the fine filter can be a sand filter, a multi-media filter or a membrane assembly. The filtered water has chromaticity less than 3, $COD_{Cr}$ less than 50 mg/L, ammonia less than 1 mg/L, SS not detected, turbidity less than 5, water reuse rate greater than 95%, and the recycled water can be used for skin washing step, liming step, etc. in the production process.

The invention is directed to a study about typical tanning wastewater composition and the nature of typical processing system and a result of the study is to devise a wastewater treatment and purification apparatus and reuse method for recycling.

Advantageous Effects

Comparing with the typical biological flocculation method+biochemical method, the invention has the following advantages:

1. Reducing the amount of flocculants by ½ to ⅘ and reducing the consumption per unit of product chemicals and reducing pharmaceutical cost.

2. Reducing sludge discharge by ½ to ⅘, thereby significantly reducing the cost of sludge treatment.

3. After treating, about 95% of wastewater can be recycled, reducing wastewater discharge, avoiding water pollution to the environment, reducing water resources waste, and having certain economic benefits.

Comparing with the typical electrolysis, the invention has the following advantages:

1. Anode of the first nanocatalytic electrolyzer is a titanium substrate having a surface covered with crystal grains of 15 to 32 nm nanocatalytic coating and served as an inert electrode which is difficult of being consumed, low cost, and high electric efficiency.

2. The recycled water is a colorless liquid with a substantial portion of $COD_{Cr}$, ammonia, suspended solids (SS), and chromaticity being removed. More than 90% of microorganisms in wastewater are killed. Most recycled wastewater can be reused with a recycling rate of more than 95%.

3. A significant reduction of electricity consumption.

4. A substantial reduction of water consumption per unit of product produced and wastewater emissions. A significant reduction in water consumption indicators and wastewater emission indicators are obtained.

5. The total wastewater emissions and total $COD_{Cr}$ emissions are greatly reduced.

The above and other objects, features and advantages of the invention will become apparent from the following detailed description taken with the accompanying drawings.

BRIEF DESCRIPTION OF THE DRAWINGS

FIG. 2 is Table 1 showing quality indicators of tanning wastewater according to the invention;

FIG. 3 is Table 2 showing quality indicators of the reused water according to the invention;

FIG. 4 is Table 3 showing quality indicators of the tanning wastewater according to the invention; and FIG. 5 is Table 4 showing quality indicators of the reused water according to the invention.

DETAILED DESCRIPTION OF THE INVENTION

Figure 1:
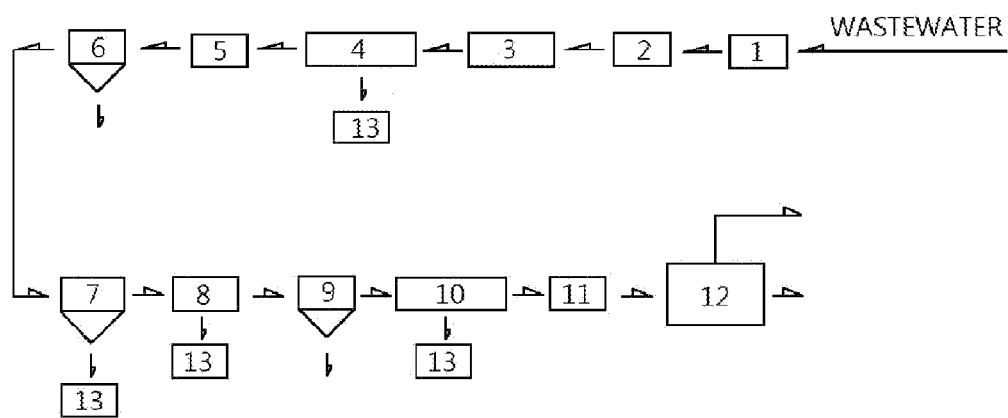
FIG. 1 schematically depicts a tanning wastewater treatment and reuse apparatus according to the invention.

Referring to FIGS. 1 to 5, a tanning wastewater treatment and reuse apparatus in accordance with the invention comprises the following components as discussed in detail below.

A coarse filter 1, a regulation pool 2, a hydraulic sieve 3, a desulfurization pool 4, a first nanocatalytic electrolyzer 5, a flocculation pool 6, a first settling pool 7, a flotation device 8, a biochemical pool 9, a second settling pool 10, a second nanocatalytic electrolyzer 11, a fine filter 12, and a compressor 13 are provided. Inlet of the coarse filter 1 is connected to a combined wastewater source. Outlet of filtered wastewater of the coarse filter 1 is connected to inlet of the regulation pool 2. Inlet of the hydraulic sieve 3 is connected to a wastewater outlet of the regulation pool 2. Inlet of the desulfurization pool 4 is connected to outlet of the hydraulic sieve 3. Precipitate output of the desulfurization pool 4 is connected to the compressor 13 via a pump and pipes. Inlet of the first nanocatalytic electrolyzer 5 is connected to an inlet of the flocculation pool 6. An outlet of the flocculation pool 6 is connected to an inlet of the first settling pool 7. Precipitate outlet of the first settling pool 7 is connected to the compressor 13 via a pump and pipes. A wastewater outlet of the first settling pool 7 is connected to an inlet of the flotation device 8. An upper impurities outlet of the flotation device 8 is connect to the compressor 13 via a pump and pipes. A lower wastewater outlet of the flotation device 8 is connected to the biochemical pool 9 via a pump. An outlet of the biochemical pool 9 is connected to an inlet of the second settling pool 10. An upper wastewater outlet of the second settling pool 10 is connected to an inlet of the second nanocatalytic electrolyzer 11. A precipitate outlet on a bottom of the second settling pool 10 is connected to the compressor 13 via a pump and pipes. A wastewater outlet of the second nanocatalytic electrolyzer 11 is connected to an inlet of the fine filter 12. An outlet of the fine filter 12 is connected to a water tank. A filtrate outlet of the compressor 13 is connected to an inlet of the biochemical pool 9 via a pump and pipes. Impurities of the compressor 13 are conveyed to a mud pool via a conveyor.

Preferred Embodiments of the Invention

Preferred embodiments of the invention based on nanocatalytic technology for tanning wastewater treatment and reuse apparatus and method therefore are detailed below.

Preferred Embodiment 1

Step 1 of Desulfurization

Flowing tanning wastewater into the coarse filter 1 to remove large particulate solids, next flowing the regulation pool 2 for mixing, and then pumping the wastewater from the regulation pool 2 to the hydraulic sieve 3 to remove fibers and other impurities, and then flowing the filtered wastewater to the desulfurization pool 4. Equivalent concentration of sulfur in wastewater can be determined prior to the desulfurization. Adding a solution of ferrous sulfate with equivalent concentration of 1:1.1 to wastewater for desulfurization and separation into iron sulfide sludge and desulfurized wastewater.

Step 2 of First Nanocatalytic Electrolysis

After step 1, pump desulfurized wastewater into the first nanocatalytic electrolyzer 5 for electrolysis. The operating voltage of the electrolysis may be 2 to 500V, the voltage between the two electrodes may be 2 to 8 V, electrolytic density is 10 to 300 mA/cm$^2$, the desulfurized wastewater is kept in the first nanocatalytic electrolyzer 5 for a time of 5 to 15 min, and electricity consumed for wastewater electrolysis is controlled at 0.8 to 1.2 degree/m$^3$.

Step 3 of Flocculation

After step 2, flowing wastewater which has been processed by the first nanocatalytic electrolyzer 5 into the flocculation pool 6, adding prepared flocculants, coagulant agents and flotation agents (e.g., PAM) to the flocculation pool 6 for flocculation reaction, flowing same to the first settling pool 7 for precipitate, flowing the precipitate on the bottom of the first settling pool 7 to the compressor 13 via pump and pipes for separating into filtrate and sludge, flowing wastewater in the first settling pool 7 to the flotation device 8 for separating the impurities from the wastewater, flowing the impurities to a compressor 13 via pump and pipes for separating into filtrate and sludge, flowing the filtrate to the biochemical pool 9, and flowing the wastewater in a lower portion of the flotation device 8 into the biochemical pool 9.

Step 4 of Biochemical Treatment

After step 3, flocculated wastewater in a lower portion of the flotation device 8 flowing into the biochemical pool 9, next subjecting same through aerobic or anaerobic+aerobic treatment, and subjecting same in the second settling pool 10, flowing the biochemically treated wastewater out of upper portion of the second settling pool 10, precipitate accumulated on bottom of the second settling pool 10 pumped by the pump to the compressor 13 via pipes for separating into filtrate and sludge, flowing the filtrate to the biochemical pool 9 via pipes, and subjecting the filtrate to a biochemical treatment to obtain biochemically treated wastewater which has chromaticity of 60 to 200, $COD_{Cr}$ of 50 to 100 mg/L, and ammonia is of 0 to 30 mg/L.

Step 5 of Second Catalytic Electrolysis

Flowing biochemically treated wastewater out of upper portion of the second settling pool 10 into the second nanocatalytic electrolyzer 11 for electrolysis. The operating voltage of the electrolysis may be 2 to 400V (preferably is 13 to 200V), the voltage between the two electrodes may be 2 to 8 V (preferably is 3 to 5V), the current density is 10 to 300 mA/cm$^2$ (preferably is 100 to 2300 mA/cm$^2$), wastewater is kept in the second nanocatalytic electrolyzer for 2 to 3 min (preferably is 3 to 4 min), and electricity consumed for wastewater electrolysis is controlled at 0.9 to 1.2 degree/m$^3$.

Step 6 of Filtration

Flowing wastewater from the second nanocatalytic electrolyzer 11 into a fine filter 12 to remove solid impurities.

The fine filter 12 can be a sand filter, a multi-media filter or a membrane assembly. The filtered water obtained through the fine filter 12 can be reused as recycled water which is a colorless or near colorless fluid having a chromaticity less than 3, $COD_{Cr}$ less than 50 mg/L, ammonia less than 1 mg/L, SS not detected, turbidity less than 3, and wastewater reuse rate greater than 95%.

Preferred Embodiment 2

As shown in FIG. 1, it is a preferred embodiment of the invention based on nanocatalytic technology for tanning wastewater treatment and reuse apparatus and method therefore. For example, it is a 300 tons/day tanning wastewater treatment, purification, and reuse item. The tanning wastewater (combined wastewater) having indicators is shown in Table 1 of FIG. 2.

Wastewater flows at a flow rate of 15 m$^3$/hour into the coarse filter 1 to remove large particulate solids. Next, flows to the regulation pool 2 for mixing. Next, flows wastewater out of the regulation pool 2 at a flow rate of 15 m$^3$/hour to the hydraulic sieve 3 to filter out fibers and other impurities. Next, flows into the desulfurization pool 4 in which equivalent concentration of sulfur in wastewater can be determined prior to the desulfurization, and then adding a solution of ferrous sulfate with equivalent concentration of 1:1.1 into wastewater for desulfurization and separation into iron sulfide sludge and desulfurized wastewater. The desulfurized wastewater flows into the first nanocatalytic electrolyzer 5 for electrolysis. The operating voltage of the first nanocatalytic electrolyzer 5 is 48V, current intensity is 375 A, and the voltage between the electrodes is 4.2 V. Nascent chlorine [Cl] generated by first nanocatalytic electrolysis may kill microorganisms in wastewater, oxidize and decompose organic matters in wastewater, and cause suspended solids, colloids, charged particles in the wastewater to form larger particles in the field of electricity. Thereafter, electrolyzed wastewater flows into the flocculation pool 6. Next, adding iron and polyacrylamide polymer in the flocculation pool 6 for coagulation reaction. Next, the flocculated wastewater flows into the first settling pool 7. Impurities at bottom of the first settling pool 7 are pumped through a compressor 13 to separate into filtrate and sludge. Sludge in upper portion of the first settling pool 7 flows into the flotation device 8 via a pump and pipes for separation into filtrate and sludge. The filtrate flows through the biochemical pool 9. Wastewater in a lower portion of the flotation device 8 is pumped into the biochemical pool 9. An aerobic treatment is done on wastewater in the biochemical pool 9. Next, the wastewater re-enters the second settling pool 10 for precipitation and separation. The wastewater treated by the second settling pool 10 has chromaticity of 80, $COD_{Cr}$ of 85 mg/L, and ammonia of 2.7 mg/L. Biochemically treated wastewater in the upper portion of the second settling pool 10 flows into the second nanocatalytic electrolyzer 11 for electrolysis. Regarding the electrolysis, operating voltage is 40V, current is 375 A, and wastewater is kept in the second nanocatalytic electrolyzer 11 for 4 min. The filtered water obtained through the fine filter 12 can be reused as recycled water which has a chromaticity of 1, $COD_{Cr}$ of 37 mg/L, ammonia of 0mg/L, SS not detected, and wastewater reuse rate greater than 96%. Quality indicators of the reused water are shown in Table 2 of FIG. 3.

Preferred Embodiment 3

3,000 Tons/Day Tanning Wastewater Treatment, Purification, and Reuse Project

The tanning wastewater (combined wastewater) has indicators as shown in Table 3 of FIG. 4.

Wastewater flows at a flow rate of 15 m³/hour into the coarse filter 1 to remove large particulate solids. Next, flows to the regulation pool 2 for mixing. Next, flows wastewater out of the regulation pool 2 at a flow rate of 15 m³/hour to the hydraulic sieve 3 to filter out fibers and other impurities. Next, flows into the desulfurization pool 4 in which equivalent concentration of sulfur in wastewater can be determined prior to the desulfurization, and then adding a solution of ferrous sulfate with equivalent concentration of 1:1.1 into wastewater for desulfurization and separation into iron sulfide sludge and desulfurized wastewater. The desulfurized wastewater flows into the first nanocatalytic electrolyzer 5 for electrolysis. The operating voltage of the first nanocatalytic electrolyzer 5 is 380V, current intensity is 3475 A, and the voltage between the electrodes is 4.2 V, and current density is 230 mA/cm². Nascent chlorine [Cl] generated by first nanocatalytic electrolysis may kill microorganisms in wastewater, oxidize and decompose organic matters in wastewater, and cause suspended solids, colloids, charged particles in the wastewater to form larger particles in the field of electricity. Thereafter, electrolyzed wastewater flows into the flocculation pool 6. Next, adding iron and polyacrylamide polymer in the flocculation pool 6 for coagulation reaction. Next, the flocculated wastewater flows into the first settling pool 7. Impurities at bottom of the first settling pool 7 are pumped through a compressor 13 to separate into filtrate and sludge. Sludge in upper portion of the first settling pool 7 flows into the flotation device 8 via a pump and pipes for separation into filtrate and sludge. The filtrate flows through the biochemical pool 9. Wastewater in a lower portion of the flotation device 8 is pumped into the biochemical pool 9. An aerobic treatment is done on wastewater in the biochemical pool 9. Next, the wastewater re-enters the second settling pool 10 for precipitation and separation. After biochemical treatment, wastewater in the upper portion of the second settling pool 10 flows out. Precipitate on bottom of the second settling pool 10 is pumped into the compressor 13 via a pump and pipes to be filtered and separated into filtrate and sludge. The wastewater treated by the second settling pool 10 has chromaticity of 85, $COD_{Cr}$ of 75 mg/L, and ammonia of 1.5 mg/L. Biochemically treated wastewater flows out of upper portion of the second settling pool 10 into the second nanocatalytic electrolyzer 11 for electrolysis. Regarding the electrolysis, operating voltage is 380V, current is 3670 A, wastewater is kept in the second nanocatalytic electrolyzer 11 for 3 min. The wastewater electrolyzed by the second nanocatalytic electrolyzer 11 is in turn filtered by the fine filter 12. The electrolyzed wastewater has a chromaticity of 8, $COD_{Cr}$ of 42 mg/L, ammonia of 0.9 mg/L, and SS of 1 mg/L. The fine filter 12 filters the electrolyzed wastewater. The wastewater filtered by the fine filter 12 can be reused as water which is a colorless liquid having $COD_{Cr}$ of 33 mg/L, ammonia of 0mg/L, SS not detected, and wastewater reuse rate of 95%. Quality indicators of the reused water are shown in Table 4 of FIG. 5.

Preferred Embodiment 4

A tanning wastewater treatment and reuse method comprises the following steps:

Step 1 of Desulfurization

Wastewater flows at a flow rate of 15 m³/hour into the coarse filter 1 to remove large particulate solids. Next, flows to the regulation pool 2 for mixing. Next, flows wastewater out of the regulation pool 2 at a flow rate of 15 m³/hour to the hydraulic sieve 3 to filter out fibers and other impurities. Next, flows into the desulfurization pool 4 in which equivalent concentration of sulfur in wastewater can be determined prior to the desulfurization, and then adding a solution of ferrous sulfate with equivalent concentration of 1:1.1 into wastewater for desulfurization and separation into iron sulfide sludge and desulfurized wastewater.

Step 2 of First Nanocatalytic Electrolysis

Tanning combined wastewater is nanometer-electrolyzed to produce strong oxidizing substances which may oxidize and decompose organic matters in the wastewater. $OH^-$ produced during electrolysis can be used with several metal ions (e.g., $Fe^{3+}$) to precipitately settle down. These small particles can be precipitated from the coagulant role in promoting aggregation substance suspended in solution deposition. Also during electrolysis, the electric field can quickly destroy water colloidal structure to destabilize flocculation, which greatly reduces the amount of flocculants dosing, coagulant dosage and flotation agents added in the flocculation of step 2.

The flocculants are ferrous sulfate, ferric sulfate, poly iron, aluminum sulfate, aluminum chloride, or poly aluminum, the coagulants are lime or polyacrylamide (PAM), and the flotation agents are PAM.

Anode of the first nanocatalytic electrolyzer is a titanium substrate having a surface covered with crystal grains of 15 to 32 nm nanocatalytic coating and served as an inert electrode. Cathode of the first nanocatalytic electrolyzer is a cathode made of iron, aluminum, stainless steel, zinc, copper or graphite. Flowing the tanning wastewater through the coarse filter and the hydraulic sieve to filter out fibers and other impurities in which the operating voltage may be 2 to 500V, the voltage between the two electrodes may be 2 to 8 V, electrolytic density is 10 to 260 mA/cm², the wastewater is kept in the first nanocatalytic electrolyzer for a time of 5 to 15 min, and electricity consumed for wastewater electrolysis is controlled at 0.8 to 1.2 degree/m³. Electrolysis will generate a lot of strong oxidizing free radicals (in the presence of sodium chloride having generated a nascent chlorine and hydroxyl), it can quickly oxidize and decompose organic materials in the wastewater, make wastewater to be difficult of biochemically degrade a large amount organic molecules, open loops, cut chains, transform macromolecules into smaller molecules, and provide better conditions for the biochemical treatment. Thus, it makes chromophore in dye molecules of the wastewater to be oxidized or reduced to colorless base group in order to achieve the purpose of bleaching, reducing $COD_{Cr}$ and improve the biodegradability of wastewater, and increase $BOD_5$ of wastewater by 15% to 40%.

In addition, the first nanocatalytic electrolysis has the following effects:

Focculation $OH^-$ produced during electrolysis can be used with several metal ions (e.g., $Fe^{3+}$) to precipitately settle down. These small particles can be precipitated from the coagulant role in promoting aggregation substance suspended in solution deposition. Also during electrolysis, the electric field can quickly destroy water colloidal structure to destabilize flocculation, which greatly reduces the amount of flocculants dosing, coagulant dosage and flotation agents added in the flocculation.

Decolorization

Produced during electrolysis the strong oxidizing radicals in the tanning wastewater can rapidly degrade the molecular structure of the dyes and colored materials to reduce the impact on the chromaticity of water.

Sterilization Effect

Electrolysis generates a lot of strong oxidizing free radicals, such as nascent chlorine, which can quickly kill bacteria and other microorganisms and viruses in wastewater. Thus, it has a strong sterilization effect.

Flotation Effect

Hydrogen generated by the cathode forms a large number of tiny bubbles. With the gas floating, it will carry a large amount of suspended solids and grease. After flotation, it will have the effect of solid-liquid separation, thereby further reducing $COD_{Cr}$, chromaticity and turbidity in wastewater.

Practice has proved that water electrolysis time is 5 to 15 min preferably. Excessively short time causes insufficient electrolysis, and flocculation and decolorization are poor. Excessively long time, although the effect of flocculation and decolorization is better, but a substantial power is consumed and it is economically undesired.

Practice has proved that regarding the electrolysis time and the concentration of water, the higher the concentration the longer the electrolysis time will be.

Practice has proved that the operating voltage between the electrodes is related to a distance between the electrodes. The smaller the distance the smaller the voltage will be. The voltage between the electrodes is usually 2 to 8 V and the optimum voltage is 3 to 5 V.

Practice has proved that step 2 of the first nanocatalytic electrolysis has the following advantages:

1. The required flocculants in step 3 of flocculation, coagulant dosage reduced by 40% to 70% without adding bleaching agent. This not only can significantly reduce chemical consumption, but also can reduce chemical secondary pollution.

2. Reducing discharge of sludge of 40% to 70%.

Step 3 of Flocculation

After step 2 of first nanocatalytic electrolysis, adding flocculants, coagulant agents and flotation agents to the electrolyzed wastewater can generate flocculation to remove impurities.

As described above, adding flocculants, coagulant agents and flotation agents to the electrolyzed wastewater can generate flocculation in which the flocculants are ferrous sulfate, ferric sulfate, poly iron, aluminum sulfate, aluminum chloride, or poly aluminum, the coagulants are lime or polyacrylamide (PAM), and the flotation agents are PAM.

Step 4 of Biological Treatment

The wastewater after being treated by flocculation in step 3, is subjected to aerobic or anaerobic+aerobic treatment, and then flows to the second settling pool. As a result, biochemically processed wastewater is obtained.

As described above, after the biochemical treatment and then being treated by the second settling pool for precipitation and separation, the precipitate has a chromaticity of 80 to 200, $COD_{Cr}$ of 50 to 100 mg/L, and ammonia of 0 to 30 mg/L.

Step 5 of Second Catalytic Electrolysis

After step 4 of biochemical treatment, the treated wastewater is subjected to a second catalytic electrolysis to remove colored substances and oxidized, decomposed organic matter in wastewater, thereby further reducing $COD_{Cr}$ in wastewater.

As described above, wastewater obtained by the second catalytic electrolysis in step 3 flows into the second settling pool for precipitation in which the operating voltage is 2 to 400V, the voltage between the electrodes is 2 to 8 V, the electric density is 10 to 300 mA/cm$^2$, wastewater electrolysis time is 2 to 6 min, and electricity consumed for wastewater electrolysis is controlled at 0.8 to 1.2 degree/m$^3$. The optimum operating voltage is 13 to 300V, the optimum voltage between the electrodes is 3 to 5 V, and the optimum electric density is 150 to 300 mA/cm$^2$. Strong oxidizing substances produced by electrolysis can oxidize and decompose organic matters, oxidize dyes in wastewater to decolorize and reduce $COD_{Cr}$, and kill bacteria and other microorganisms in wastewater. At the same time, with the presence of electric field wastewater is destabilized to bring about flocculation effect.

Wastewater obtained by step 5 of second catalytic electrolysis is subjected to step 6 of filtration in order to remove solid impurities.

As mentioned above, in step 6, the fine filter can be a sand filter, a multi-media filter or a membrane assembly. The electrolyzed wastewater obtained by the second catalytic electrolysis is in turn subjected to further filtering in order to produce water for reuse (i.e., recycled water). The filtered water has chromaticity less than 3, $COD_{Cr}$ less than 50 mg/L, ammonia less than 1 mg/L, and SS being zero.

As described above, the invention consists of the following three parts:

The first part includes step 1 of desulfurization step 1, step 2 of first nanocatalytic electrolysis, and step 3 of flocculation. This part uses the coarse filter to remove fur, meat and other large particles out of wastewater. Next, the wastewater flows to the regulation pool for mixing. Next, the wastewater flows to the hydraulic sieve to remove impurities such as fur. Next, desulfurized ferrous sulfate is added to wastewater for desulfurization. Next, the wastewater is subjected to first nanocatalytic electrolysis to oxidize and decompose organic matters in the wastewater and precipitate suspended solids and colloidal material. Next, the wastewater is subjected to flotation separation to remove solid impurities floating on the surface and oil. Finally, flocculants, coagulant agents, and flotation agents are added to wastewater for precipitating most organic compounds and salts. As a result, $COD_{Cr}$ indicator drops from 3,000 to 4,000 mg/L to below 1,500 mg/L in order to ensure that the biochemical system (Part II) can operate in a long, stable condition.

The second part includes step 4 of biochemical treatment for substantially removing $COD_{Cr}$, pigment, and ammonia out of wastewater in order to ensure quality of the recycled water flowing to the third part. Step 4 of biochemical treatment includes the aerobic, a combination of anaerobic treatment and aerobic treatment, or the second settling process.

The third part includes step 5 of second catalytic electrolysis and step 6 of filtration. Wastewater treated by the second part is subjected to s step 5 of second catalytic electrolysis and step 6 of filtration for further decolorization and removal of suspended solids and other impurities. The obtained recycled water meets the requirements for further use and is also known as reclaimed water suitable for reuse.

Industrial Applicability

Comparing with the typical flocculation method+biochemical method, the invention has the following advantages: Reducing the amount of flocculants by ½ to ⅘. Reducing the consumption per unit of product chemicals and reducing pharmaceutical cost. Reducing sludge discharge by ½ to ⅘, thereby significantly reducing the cost of sludge treatment. After treatment, about 95% of wastewater can be recycled, reducing wastewater discharge, avoiding water pollution to the environment, reducing water resources waste, and having certain economic benefits. Comparing with the typical electrolysis, the invention has the following advantages: Anode of the first nanocatalytic electrolyzer is a titanium substrate having a surface covered with crystal grains of 15 to 32 nm nanocatalytic coating and served as an inert electrode which is difficult of being consumed, low cost, and high electric efficiency. More than 99% of microorganisms in wastewater are killed. Most recycled wastewater can be reused with a recycling rate of more than 95%. A significant reduction of electricity consumption is obtained. A substantial reduction of water consumption per unit of product produced and wastewater emissions. A significant reduction in water consumption indicators and wastewater emission indicators are obtained. The total wastewater emissions and total $COD_{Cr}$ emissions are greatly reduced.

While the invention has been described in terms of preferred embodiments, those skilled in the art will recognize that the invention can be practiced with modifications within the spirit and scope of the appended claims.

What is claimed is:

1. A tanning wastewater treatment and reuse apparatus comprising:
    a coarse filter;
    a regulation pool;
    a hydraulic sieve;
    a desulfurization pool;
    a first nanocatalytic electrolyzer;
    a flocculation pool;
    a first settling pool;
    a flotation device;
    a biochemical pool;
    a second settling pool;
    a second nanocatalytic electrolyzer;
    a fine filter; and
    a compressor;
    wherein the coarse filter has an inlet and an outlet connected to an inlet of the regulation pool, an inlet of the hydraulic sieve is connected to an outlet of the regulation pool, an inlet of the desulfurization pool is connected to an outlet of the hydraulic sieve, a precipitate outlet of the desulfurization pool is connected to the compressor, an inlet of the first nanocatalytic electrolyzer is connected to a wastewater outlet of the desulfurization pool, an outlet of the first nanocatalytic electrolyzer is connected to an inlet of the flocculation pool, an outlet of the flocculation pool is connected to an inlet of the first settling pool, a precipitate outlet of the first settling pool is connected to the compressor, a wastewater outlet of the first settling pool is connected to an inlet of the flotation device, an impurities outlet of the flotation device is connected to the compressor, a wastewater outlet of the flotation device is connected to an inlet of the biochemical pool, an outlet of the biochemical pool is connected to an inlet of the second settling pool, a wastewater outlet of the second settling pool is connected to an inlet of the second nanocatalytic electrolyzer, a precipitate outlet of the second settling pool is connected to the compressor, a wastewater outlet of the second nanocatalytic electrolyzer is connected to an inlet of the fine filter, water for reuse flows out of an outlet of the fine filter, and impurities in the compressor are for discharge.

2. The tanning wastewater treatment and reuse apparatus of claim 1, wherein the impurities outlet of the flotation device is disposed on an upper portion thereof, the wastewater outlet of the flotation device is located on a lower portion thereof, the wastewater outlet of the second settling pool is located on an upper portion thereof, and the precipitate outlet of the second settling pool is located on a bottom thereof.

3. The tanning wastewater treatment and reuse apparatus of claim 1, wherein an anode of the first nanocatalytic electrolyzer is a titanium substrate having a surface covered with crystal grains of 15 to 32 nm nanocatalytic coating and served as an inert electrode, and a cathode of the first nanocatalytic electrolyzer is a cathode made of iron, aluminum, stainless steel, zinc, copper or graphite.

4. A tanning wastewater treatment and reuse method, comprising the steps of:
    (1) desulfurization by flowing combined tanning wastewater into a coarse filter to remove large particles of solids prior to flowing into a regulation pool, pumping the combined tanning wastewater out of the regulation pool to pass through a hydraulic sieve to remove fibers and impurities prior to flowing into a desulfurization pool, adding ferrous sulfate solution to the combined tanning wastewater, performing desulfurization, and separating the combined tanning wastewater into iron sulfide sludge and desulfurized wastewater;
    (2) first nanocatalytic electrolysis by pumping the desulfurized wastewater into a first nanocatalytic electrolyzer for electrolysis;
    (3) flocculation by flowing the electrolyzed wastewater into a flocculation pool, adding a flocculant, a coagulant agents, and a flotation agent to the flocculation pool for flocculation, flowing the flocculated wastewater to a first settling pool for forming precipitate, flowing the precipitate on a bottom of the first settling pool to a compressor for separating into filtrate and sludge, flowing the wastewater in the first settling pool to a flotation device for separating impurities from the wastewater, and flowing the impurities from the flotation device to the compressor for separating into filtrate and sludge;
    (4) biochemical treatment by flowing the wastewater in a lower portion of the flotation device into a biochemical pool, subjecting the wastewater to an aerobic treatment, or an anaerobic and aerobic treatment, and subjecting the wastewater to a biochemical treatment in a second settling pool, and pumping precipitate from a bottom of the second settling pool into the compressor for separating into filtrate and sludge;

(5) second catalytic electrolysis by flowing the biochemically treated wastewater out of an upper portion of the second settling pool into a second nanocatalytic electrolyzer for electrolysis; and (6) filtration by flowing the electrolyzed wastewater from the second nanocatalytic electrolyzer into a fine filter to remove solid impurities to produce water for reuse.

5. The tanning wastewater treatment and reuse method of claim 4, wherein in step (1) equivalent concentration of sulfur in the wastewater is determined prior to the desulfurization, and subsequently adding a solution of ferrous sulfate with equivalent concentration of 1:1.1 into the wastewater for desulfurization and separation into iron sulfide sludge and desulfurized wastewater.

6. The tanning wastewater treatment and reuse method of claim 4, wherein in step (2) an operating voltage of the electrolysis is 2 to 500 V, a voltage between two electrodes is 2 to 8 V, an electrolytic density is 10 to 300 mA/cm$^2$, and the desulfurized wastewater is kept in the first nanocatalytic electrolyzer for a time of 5 to 15 minutes.

7. The tanning wastewater treatment and reuse method of claim 4, wherein in step (3) the flocculants is ferrous sulfate, ferric sulfate, poly iron, aluminum sulfate, aluminum chloride, or poly aluminum, the coagulant agent is lime or polyacrylamide (PAM), and the flotation agents are PAM.

8. The tanning wastewater treatment and reuse method of claim 4, wherein in step wherein in step (5) an operating voltage of the electrolysis is 2 to 400V, a voltage between two electrodes may is 2 to 8 V, a current density is 10 to 300 mA/cm$^2$, and the wastewater is kept in the second nanocatalytic electrolyzer for 2 to 6 minutes.

9. The tanning wastewater treatment and reuse method of claim 4, wherein in step (6) the fine filter is a sand filter, a multi-media filter or a membrane assembly.

* * * * *